(12) United States Patent
Sato et al.

(10) Patent No.: US 10,789,476 B2
(45) Date of Patent: Sep. 29, 2020

(54) INFORMATION PROCESSING APPARATUS AND INFORMATION PROCESSING METHOD

(71) Applicant: SONY CORPORATION, Tokyo (JP)

(72) Inventors: Naoyuki Sato, Tokyo (JP); Akihiko Izumi, Kanagawa (JP); Kuniaki Torii, Kanagawa (JP); Ryo Fukazawa, Kanagawa (JP); Katsuya Hyodo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/444,454

(22) Filed: Jun. 18, 2019

(65) Prior Publication Data
US 2019/0303675 A1 Oct. 3, 2019

Related U.S. Application Data

(63) Continuation of application No. 15/559,890, filed as application No. PCT/JP2016/056874 on Mar. 4, 2016, now Pat. No. 10,360,453.

(30) Foreign Application Priority Data

Mar. 31, 2015 (JP) .................................. 2015-073745

(51) Int. Cl.
G06K 9/00 (2006.01)
G06K 9/32 (2006.01)
(Continued)

(52) U.S. Cl.
CPC ..... *G06K 9/00671* (2013.01); *G06K 9/00624* (2013.01); *G06K 9/3241* (2013.01);
(Continued)

(58) Field of Classification Search
CPC .............. G06T 19/006; G06K 9/00624; G06K 9/00671; G06K 2209/03; H04L 67/10; H04L 67/141
See application file for complete search history.

(56) References Cited

U.S. PATENT DOCUMENTS

2012/0221628 A1* 8/2012 Fujigaki ................ H04L 67/146
709/203
2012/0262494 A1 10/2012 Choi et al.
(Continued)

FOREIGN PATENT DOCUMENTS

EP 2661144 A2 11/2013
JP 2009-255600 A 11/2009
(Continued)

OTHER PUBLICATIONS

International Search Report and Written Opinion of PCT Application No. PCT/JP2016/056874, dated Apr. 12, 2016, 06 pages of English Translation and 06 pages of ISRWO.
(Continued)

*Primary Examiner* — Jeffery A Brier
(74) *Attorney, Agent, or Firm* — Chip Law Group

(57) ABSTRACT

An information processing apparatus to link devices by recognizing the appearance of a device, such as an unknown application or a dynamically changing application. The information processing apparatus according to the present disclosure includes an appearance information acquisition unit configured to acquire appearance information indicating a feature of appearance of an own device; and a sending unit configured to send the appearance information to communicate with another device that has imaged the appearance of the own device. According to such a configuration, it is
(Continued)

possible to link devices by recognizing the appearance of a device, such as an unknown application or a dynamically changing application.

7 Claims, 12 Drawing Sheets

(51) Int. Cl.
  *G06T 7/73* (2017.01)
  *G06T 19/00* (2011.01)
  *H04L 29/08* (2006.01)

(52) U.S. Cl.
  CPC .............. *G06T 7/73* (2017.01); *G06T 19/006* (2013.01); *G06K 2209/03* (2013.01); *G06T 2207/10016* (2013.01); *H04L 67/10* (2013.01)

(56) References Cited

U.S. PATENT DOCUMENTS

| | | | |
|---|---|---|---|
| 2013/0074117 A1 | 3/2013 | Song et al. | |
| 2013/0297839 A1 | 11/2013 | Chai et al. | |
| 2014/0053086 A1 | 2/2014 | Kim et al. | |
| 2014/0063060 A1* | 3/2014 | Maciocci | G06T 19/006 |
| | | | 345/633 |
| 2014/0063064 A1 | 3/2014 | Seo et al. | |
| 2014/0075349 A1 | 3/2014 | Yun et al. | |
| 2014/0085526 A1 | 3/2014 | Takahashi et al. | |
| 2014/0104140 A1 | 4/2014 | Sano et al. | |
| 2014/0197232 A1* | 7/2014 | Birkler | H04L 63/08 |
| | | | 235/375 |
| 2015/0338913 A1 | 11/2015 | Shigeta et al. | |

FOREIGN PATENT DOCUMENTS

| | | |
|---|---|---|
| JP | 2011-114579 A | 6/2011 |
| JP | 2013-236375 A | 11/2013 |
| JP | 2014-096780 A | 5/2014 |
| KR | 10-2013-0123506 A | 11/2013 |
| WO | 2008/001503 A1 | 1/2008 |
| WO | 2013/165205 A1 | 11/2013 |

OTHER PUBLICATIONS

Huang, et al., "Inter-vehicle communication, license plate verification, and distance estimation for the construction of driving surroundings", International Conference on Connected Vehicles and Expo (ICCVE), Nov. 3-7, 2014, pp. 661-666.

International Preliminary Report on Patentability of PCT Application No. PCT/JP2016/056874, dated Oct. 12, 2017, 07 pages of English Translation and 03 pages of IPRP.

* cited by examiner

RECOGNIZE APPLICATION ON Tabletop FROM Mobile

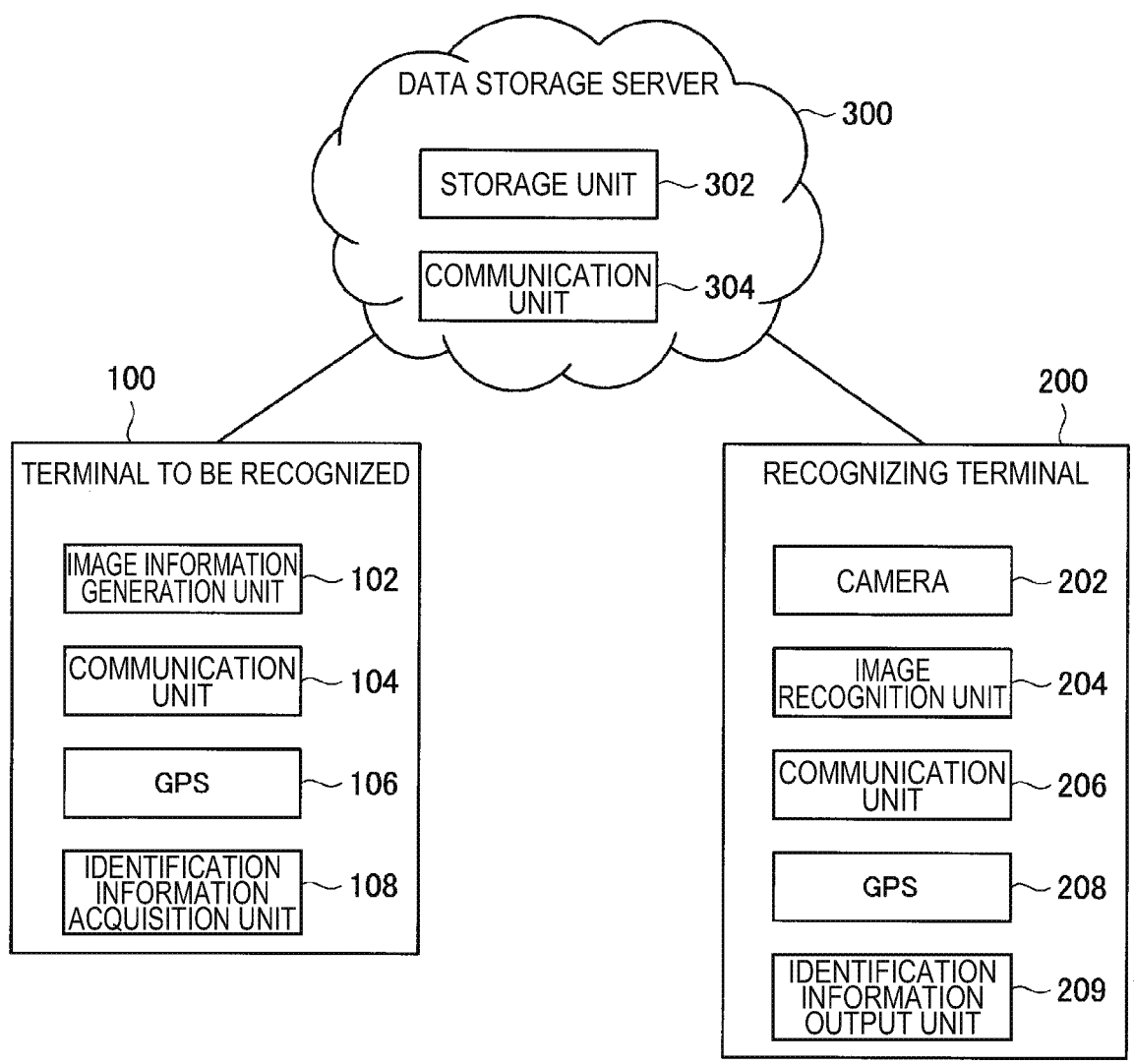

FIG.6

| | NETWORK INTERFACE | INTERNET LAYER | TRANSPORT LAYER | APPLICATION LAYER | COMMUNICATION FORMAT |
|---|---|---|---|---|---|
| DEVICE A | WiFi | 192.168.1.11:80(IPv4) | TCP | HTTP | JSONRPC |
| DEVICE B | Bluetooth | [2001:db8::dead:beaf]:80(IPv6) | TCP | HTTP | SOAP |
| DEVICE C | Ethernet | 211.125.138.198:8080(IPv4) | UDP | wss | JSONRPC |

INFORMATION PROCESSING APPARATUS AND INFORMATION PROCESSING METHOD

CROSS-REFERENCE TO RELATED APPLICATION

The present application is a continuation application of U.S. patent application Ser. No. 15/559,890, filed Sep. 20, 2017, which is a national stage entry of PCT/JP2016/056874, filed Mar. 4, 2016, which claims priority from prior Japanese Priority Patent Application JP 2015-073745 filed in the Japan Patent Office on Mar. 31, 2015, the entire contents of which are hereby incorporated by reference.

TECHNICAL FIELD

The present disclosure relates to an information processing apparatus, an information processing method, and a program.

BACKGROUND ART

Technology that augments the real environment obtained through a camera or like using a computer is being studied as augmented reality (AR). In particular, many AR applications that recognize an object and display appropriate information in a superimposed manner, by holding a camera of a mobile terminal over the object are being developed due to mobile terminals equipped with cameras being easier to use as the result of the popularization of smartphones in recent years. Thus, Patent Literature 1 below describes technology that assumes a program itself functions as an authentication key.

CITATION LIST

Patent Literature

Patent Literature 1:
JP 2002-344444A

DISCLOSURE OF INVENTION

Technical Problem

In an AR application, it was necessary to add a special tag image or marker image to an object that serves as the subject, to perform object recognition with an image obtained from a camera. Therefore, a markerless AR method that recognizes an object by analyzing features obtained from the image, without using a marker image, is also conceivable.

However, with either approach, it was necessary to record the features to be recognized as dictionary data beforehand, to recognize the object. Therefore, objects for which it is difficult to acquire features beforehand, such as unknown applications running on another terminal, and applications in which the state of a screen dynamically changes, were difficult to use as objects to be recognized.

Thus, there has been a desire to link devices by recognizing the appearance of a device, such as an unknown application or a dynamically changing application.

Solution to Problem

According to the present disclosure, there is provided an information processing apparatus including: an appearance information acquisition unit configured to acquire appearance information indicating a feature of appearance of an own device; and a sending unit configured to send the appearance information to communicate with another device that has imaged the appearance of the own device.

The information processing apparatus may include a display screen. The appearance information acquisition unit may include an image information generation unit configured to generate image information indicating a feature of a screen displayed on the display screen as the appearance information.

In addition, the sending unit may send, together with the image information, communication information for communicating with the other device.

In addition, a plurality of applications may be displayed on the display screen, the image information generation unit may generate the image information for each of the plurality of applications, and the sending unit may send the image information generated for each application.

In addition, communication may be performed with the other device for which it has determined that a captured image of the display screen and the image information match.

In addition, the information processing apparatus may include an identification information acquisition unit configured to acquire identification information for identifying the other device. The sending unit may send the identification information together with the image information.

In addition, the identification information may include at least a portion of an IP address of the other device.

In addition, the identification information acquisition unit may acquire the identification information sent by beacon, sound, or light.

In addition, the information processing apparatus may include a position information acquisition unit configured to acquire position information. The sending unit may send the position information together with the image information.

In addition, according to the present disclosure, there is provided an information processing method including: acquiring appearance information indicating a feature of appearance of an own device; and sending the appearance information to communicate with another device that has imaged the appearance of the own device.

In addition, according to the present disclosure, there is provided a program for causing a computer to function as means for acquiring appearance information indicating a feature of appearance of an own device, and means for sending the appearance information to communicate with another device that has imaged the appearance of the own device.

Advantageous Effects of Invention

As described above, according to the present disclosure, it is possible to link devices by recognizing the appearance of a device, such as an unknown application or a dynamically changing application. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a schematic view of the configuration of the system according to the embodiment.

FIG. 6 is a schematic view of examples of communication information.

MODE(S) FOR CARRYING OUT THE INVENTION

Figure 1A:
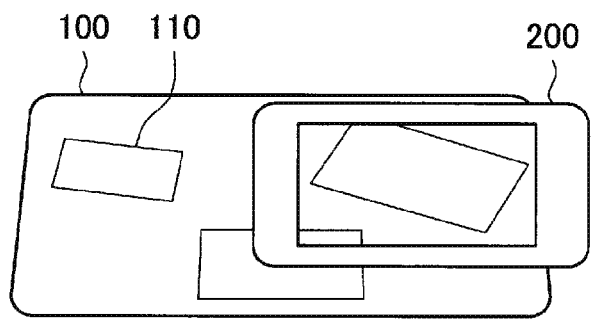
FIG. 1A is a schematic view of an outline of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description will be given in the following order.
1. Configuration example of the system
2. Terminal and server processes
3. Examples of communication information
4. Case in which application screen is a moving image
5. Narrowing down recorded information
6. Examples of application of the embodiment
   6.1. Application to a tabletop interactive system
   6.2. Wearable devices and other display devices
   6.3. Recognition of applications on a large screen display installed on a wall
   6.4. Wearable cameras and home electric appliances

1. Configuration Example of the System

Figure 1B:
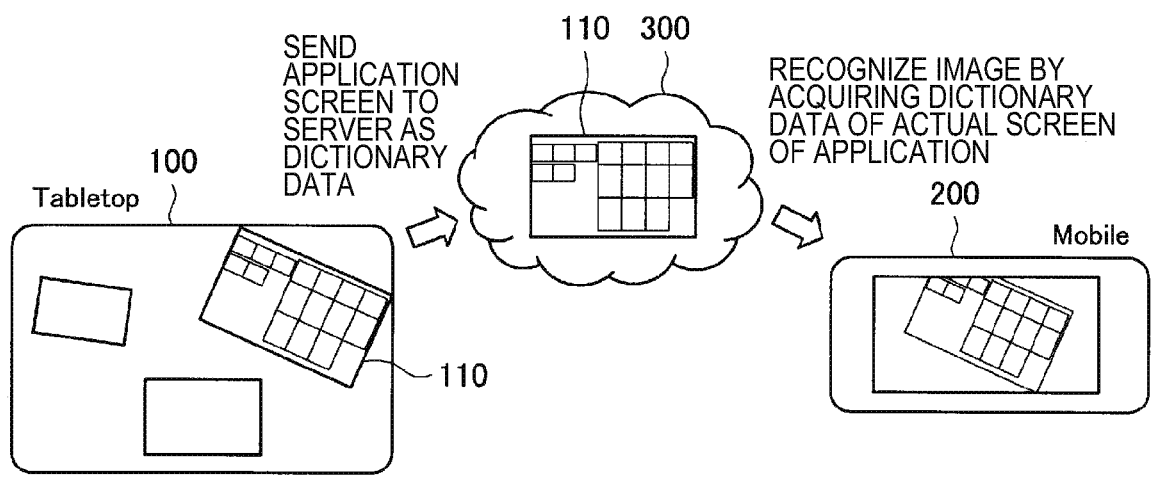
FIG. 1B is a schematic view of an outline of a system according to an embodiment of the present disclosure.

FIG. 1B and FIG. 1A are schematic views of an outline of a system according to an embodiment of the present disclosure. This system performs communication between a recognized terminal and a recognizing terminal that are linked by one terminal recognizing, via a camera image, an application running on another terminal, when linking a plurality of terminals. As illustrated in FIG. 1A, in this system, a mobile device that serves as a recognizing terminal 200 images an application screen 110 of a tablet terminal that serves as a terminal 100 to be recognized.

As illustrated in FIG. 1B, the terminal 100 to be recognized sequentially records the application screen 110 as dictionary data on a server 300. The recognizing terminal 200 acquires the dictionary data from the server 300 and compares the dictionary data with an image obtained through the imaging. Then, if the result of the comparison is such that the dictionary data and the image match, the terminal 100 and the terminal 200 start to communicate.

FIG. 2 is a schematic view of the configuration of a system 1000 according to the embodiment. As illustrated in FIG. 2, the system 1000 includes the terminal 100 to be recognized, the recognizing terminal 200, and the server 300. The terminal 100 to be recognized displays an application or the like on a display screen. The terminal 100 to be recognized also includes an image information generation unit 102, which generates the application screen on the terminal 100 as image information (dictionary data). The terminal 100 records the image information on the server 300 by sending the image information from a communication unit 104 to a communication unit 304 of the server 300. The server 300 has a storage unit 302 for image information. Note that constituent elements of the terminals 100 and 200, and the server 300, illustrated in FIGS. 1A and 1B may be formed by hardware (circuits), or by a central processing unit such as a CPU, and a program (software) that makes the central processing unit function. In this case, the program can be stored on a recording medium such as memory provided inside a device, or memory connected from the outside.

The image information generation unit 102 of the terminal 100 generates image information regarding features for image recognition and a snapshot of an application being displayed by the terminal 100, and records the data on a storage unit 302 of the server 300. If a plurality of application screens are being displayed on the terminal 100, image information is sent for each application screen. The terminal 100 simultaneously records, on the server 300, both communication information for the terminal 100 and the terminal 200 to communicate with each other, and communication information for the terminal 200 to communicate with an application being displayed on the terminal 100. The image information can also be generated on the server 300 using snapshot data, instead of being generated on the terminal 100 to be recognized. The application screen may be a still image or a moving image.

The recognizing terminal 200 has a camera 202, an image recognition unit 204, and a communication unit 206. The camera 202 images the application screen displayed on the terminal 100, and the image recognition unit 204 recognizes an image obtained through the imaging. The communication unit 206 communicates with the communication unit 304 of the server 300, and acquires the image information stored on the storage unit 302. The image recognition unit 204 recognizes the application being displayed on the terminal 100, by comparing the image information with the image data input from the camera 202. Then, if the application screen imaged by the camera 202 matches the image information acquired from the server 300, information for communicating with the terminal 100 and information for communicating with the application being displayed on the terminal 100 is acquired from the storage unit 302 of the server 300, and communication with the terminal 100 to be recognized starts.

The storage unit 302 of the server 300 stores image information to be recorded from the terminal 100 to be recognized, information for the terminal 100 and the terminal 200 to communicate with each other, and information for the terminal 200 to communicate with the application of the terminal 100, and provides the stored data in response to a request from the image recognition unit 202 of the recognizing terminal 200. Note that a dictionary data storage function of the server 300 may be configured on the terminal 100 having a dictionary data generating function, or on the terminal 200 having an image recognizing function.

Therefore, according to the system of the embodiment, the recognizing terminal 200 and terminal 100 to be recognized can be linked by the recognizing terminal 200 recognizing, via a camera image, an application running on the terminal 100 to be recognized, when linking a plurality of terminals.

The terminal 100 that is running the application screen to be recognized sends the image information such as the features for image recognition and the snapshot of the application screen to the server 300 in real time in accordance with a change of the screen. An unknown application or an application with a dynamically changing state can then be identified by image recognition, without generating and recording dictionary data beforehand, by the recognizing terminal 200 comparing this image information with the image from the camera 202.

As a precondition when carrying out the embodiment, the terminal 100 to be recognized, the recognizing terminal 200, and the server 300 are connected beforehand by a network or P2P so as to be able to communicate with one another. The method of connection is not particularly limited, however.

2. Terminal and Server Processes

Figure 3:
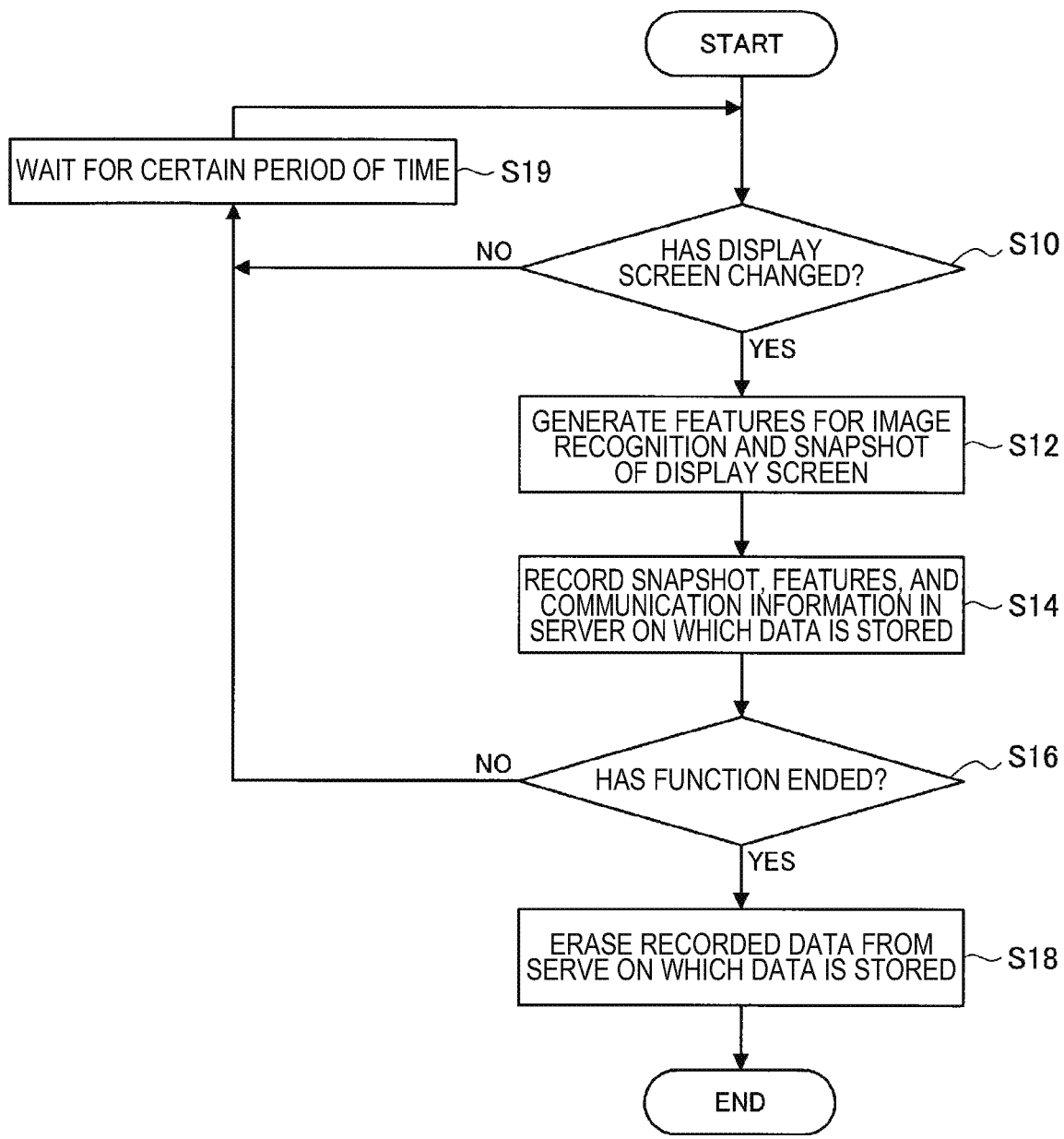
FIG. 3 is a flowchart illustrating the processes of generating and recording image information by a terminal to be recognized.

Next, the processes of generating and recording the image information by the terminal 100 to be recognized will be described with reference to FIG. 3. First, when an application on the terminal 100 to be recognized is launched, it is determined in step S10 whether the display screen has changed. If the display screen has changed, the process proceeds on to step S12, where image information regarding the features for image recognition and the snapshot of the display screen is generated. On the other hand, if there is no change in the display screen, the process waits for a certain period of time in step S19, and then returns to step S10, where it is again determined whether the display screen has changed.

After step S12, the process proceeds on to step S14, where the server 300 records the snapshot and the features for image recognition generated in step S12. Communication information is also recorded at this time. The communication information is information for the terminal 200 to communicate with the terminal 100, and information for the terminal 200 to communicate with the application of the terminal 100.

In the next step, step S16, it is determined whether the function of the application has ended. If the function of the application has ended, the server 300 is notified of this, and the process proceeds on to step S18. In step S18, the data recorded on the server 300 is erased. After step S18, the process ends.

Also, if in step S16 the function of the application has not ended, the process waits a certain period of time in step S19 and then returns to step S10, and the processes thereafter are performed again.

Figure 4:
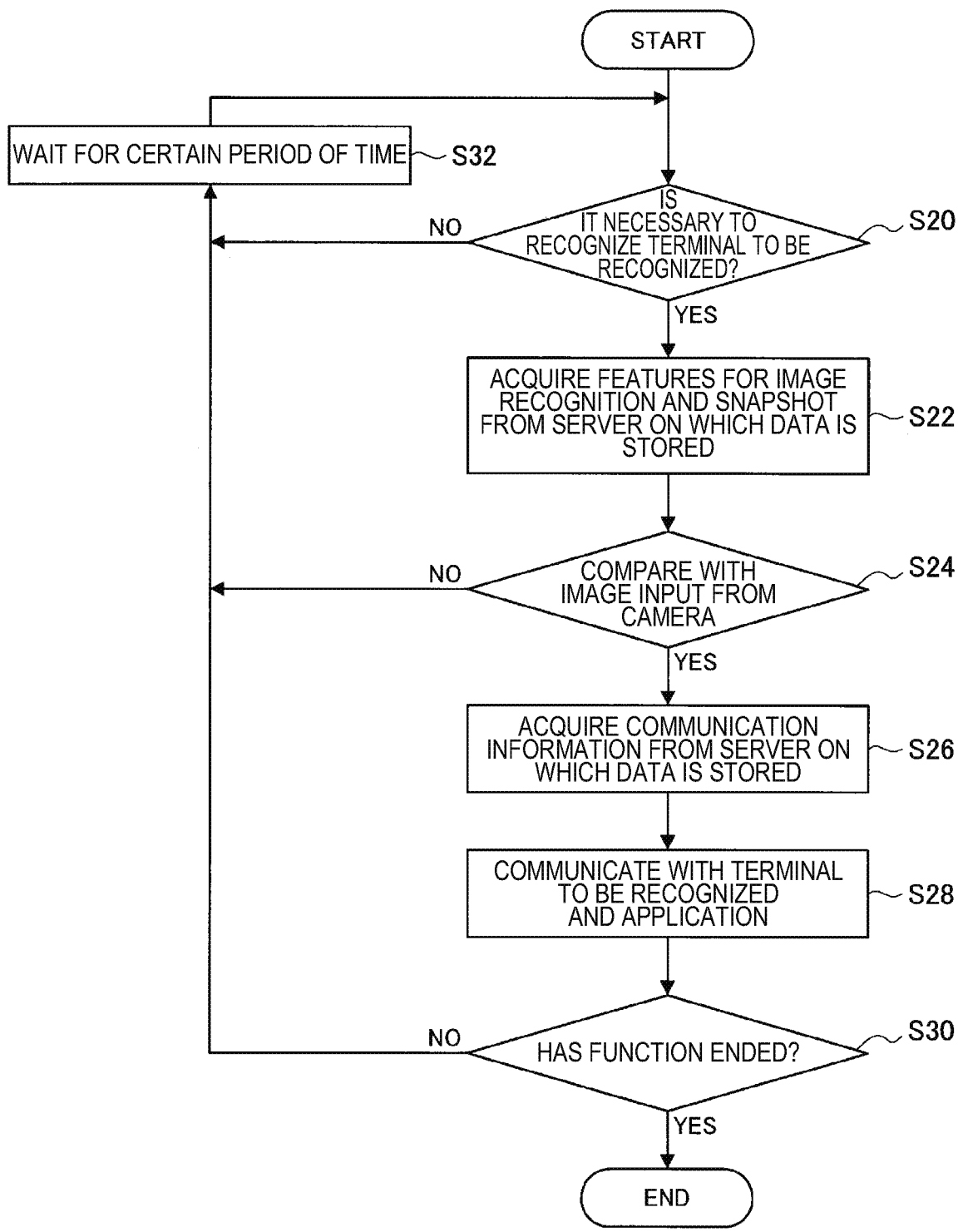
FIG. 4 is a flowchart for explaining the process of image recognition by a recognizing terminal.

Next, the process of image recognition by the recognizing terminal 200 will be described with reference to FIG. 4. First, when an application on the recognizing terminal 200 is launched, it is determined in step S20 whether it is necessary to recognize the terminal 100 to be recognized, to communicate with the terminal 100 to be recognized. If it is necessary to recognize the terminal 100 to be recognized, the process proceeds on to step S22, where the image information regarding the image features and the snapshot are acquired from the server 300. On the other hand, if it is not necessary to recognize the terminal 100 to be recognized, the process waits a certain period of time in step S32 and then returns to step S20, and the processes thereafter are performed again.

After step S22, the process proceeds on to step S24, where the image input from the camera 202 is compared with the image information acquired in step S22. If the result of the comparison is such that the image input from the camera 202 matches the image information acquired in step S22, the process proceeds on to step S26, and the communication information stored on the server 300 is acquired. On the other hand, if the image input from the camera 202 does not match the image information acquired in step S22, the process waits a certain period of time in step S32 and then returns to step S20, and the processes thereafter are performed again. In this matching determination, the captured image is analyzed, the features are extracted, and these features are compared with the features in the image information, by a method similar to a well-known face detection algorithm or the like, for example. Then it is determined whether the images match, on the basis of the degree of correlation by a template matching process or the like.

After step S26, the process proceeds on to step S28. In step S28, the terminal 200 communicates with the terminal 100 on the basis of the communication information. As a result, the terminal 200 is able to communicate with the application displayed on the terminal 100. In the next step, step S30, it is determined whether the function of the application has ended. If the function of the application has ended, the process ends.

On the other hand, if the function of the application has not ended, the process waits a certain period of time in step S32 and then returns to step S20, and the processes thereafter are performed again.

Figure 5:
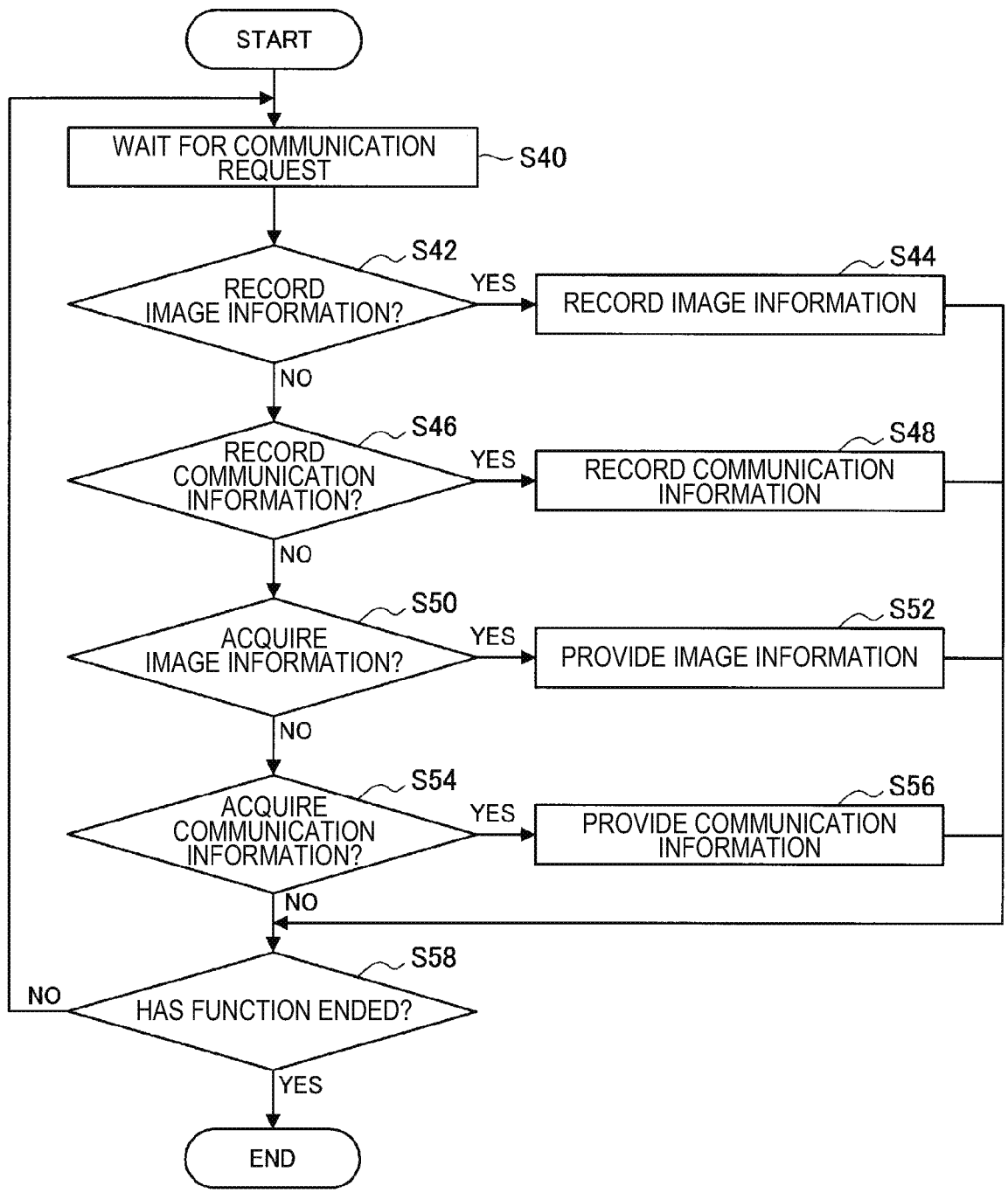
FIG. 5 is a flowchart for explaining the process of a dictionary data storage function of a server.

Next, the process of the dictionary data storage function of the server 300 will be described with reference to FIG. 5. First, when the dictionary data storage function of the server 300 starts, the process waits for a communication request from an application on the terminal 100 to be recognized or an application on the recognizing terminal 200 in step S40. If there is a request to record image information from the terminal 100 to be recognized in the next step, step S42, the process proceeds on to step S44 and the image information is recorded.

Also, if there is a request in step S46 to record communication information from the terminal 100, the process proceeds on to step S48. In step S48, the communication information is recorded.

Also, if there is a request from the terminal 200 in step S50 to acquire image information, the process proceeds on to step S52. In step S52, the image information is provided to the terminal 200.

Also, if there is a request in step S54 to acquire communication information from the terminal 200, the process proceeds on to step S56. In step S56, the communication information is provided to the terminal 200.

In step S58, it is determined whether the function of the application has ended. If the function of the application has ended, the process ends. On the other hand, if the function of the application has not ended, the process returns to step S40, and the processes thereafter are performed again.

3. Examples of Communication Information

Information such as protocol name, port number, and IP address are examples of communication information. FIG. 6 is a schematic view of examples of communication information. FIG. 6 is a schematic view of communication information for a device A, a device B, and a device C, respectively. The communication information is defined for each of a network interface, an internet layer, a transport layer, an application layer, and a communication format. Information relating to the network interface includes WiFi, Bluetooth (registered trademark), Ethernet (registered trademark), and WiFi Direct, and the like. Information relating to the internet layer includes an IP address and a port number (IPv4 and IPV6). Information relating to the transport layer is TCP or UDP information. Information relating to the application layer includes HTTP, HTTPS, WebSocket (ws) and secure WebSocket (wss) and the like. Information relating to the communication format includes JSON PRC, SOAP, and REST, and the like.

The terminal 100 to be recognized and the recognizing terminal 200 are able to communicate with each other by sharing communication information via the server 300. The terminal 200 recognizes the terminal 100 by the IP address included in the communication information. The terminal 200 also recognizes the application of the terminal 100 by the port number included in the communication information. The communication information is linked to the image information and sent from the terminal 100 to the terminal 200 for each application screen, and is stored, together with the image information, on the storage unit 302. The image information is sent, together with the linked communication information, to the terminal 200 in response to a request from the terminal 200 to acquire the image information. Therefore, even if there are a plurality of application screens on the terminal 100, the terminal 200 is able to communicate with the application imaged by the camera 202, among the plurality of applications, by acquiring the port number corresponding to the image information.

4. A Case in which the Application Screen is a Moving Image

As described above, the application screen may be a moving image. If the application screen is a moving image, a mechanism for absorbing a time lag in the communication can be introduced. For example, a frame number may be sent from the terminal 100 to be recognized to the server 300 before the image information. There is no time lag in the transmission of the frame number. Time information is linked to the frame number, so the server 300 is able to recognize in advance that image information will be received. The server 300 receives the image information from the terminal 100 after the frame number. Then, when the server 300 receives the image information from the terminal 100, the image information for the frame corresponding to the requested time is extracted and sent to the terminal 200 in response to the request already received from the terminal 200. As a result, the terminal 200 is able to determine whether the image from the camera at the requested time matches the image information sent from the server 300.

Alternatively, a moving image captured by the camera 202 may also be stored (cached) for just a certain period of time in the recognizing terminal 200. As a result, even if there is a time lag when the terminal 200 receives the image information from the server 300, it is possible to determine whether the image information matches the cached moving image by comparing the received image information with the stored moving image, on the basis of the time information for the frame, on the terminal 200 side.

5. Narrowing Down Recorded Information

In a case where multiple terminals 100 to be recognized have recorded image information and communication information on the server 300, the server 300 that has received a request to acquire the image information and communication information from the recognizing terminal 200 narrows down the information from among the large amount of image information and communication information recorded, and sends the information to the terminal 200 that sent out the request to acquire the information.

In the embodiment, a search on the server 300 side can be made easier by using supplementary information for narrowing down the information. Position information is an example of such supplementary information. The terminal 100 to be recognized sends, together with the dictionary data, position information for the terminal 100 acquired by a position information acquisition unit (GPS) 106, to the server 300. The server 300 records the position information together with the image information and the communication information.

When the recognizing terminal 200 requests image information from the server 300, the recognizing terminal 200 sends the position information for the terminal 200 acquired by a position information acquisition unit (GPS) 208 to the server 300. An information extraction unit 306 of the server 300 narrows down the image information and the communication information on the basis of the position information acquired from the terminal 200. For example, the server 300 extracts image information and communication information for a terminal 100 positioned within a 10-meter radius of the position of the terminal 200 on the basis of the position information acquired from the terminal 200, and sends this image information and communication information to the terminal 200. By narrowing down the image information and communication information for multiple terminals 100 on the basis of position information in this way, a comparison between the image information and the imaging information can be easily performed on the terminal 200 side, which enables the processing load to be significantly reduced.

Various types of information aside from position information can be used as the supplementary information. For example, an identification information output unit 209 of the terminal 200 sends identification information to the terminal 100 using Beacon Wi-Fi, sound, or light or the like, from the recognizing terminal 200 toward the terminal to be recognized. An identification information acquisition unit 108 of the terminal 100 to be recognized acquires the identification information. The terminal 100 sends the identification information, together with the image information and the communication information, to the server 300, and the server 300 then records this identification information, together with the image information and the communication information.

When the recognizing terminal 200 requests image information from the server 300, the recognizing terminal 200 sends the identification information to the server 300. The server 300 narrows down the image information on the basis of the identification information acquired from the terminal 200, and then sends the image information and communication information linked to identification information that matches the identification information sent from the terminal 200, from among the image information and communication information recorded, to the terminal 200. As a result, the terminal 200 is able to extract only the image information for the imaged terminal 100, from the large amount of image information recorded. The IP address, or a portion of the IP address, of the terminal 200 can be used as the identification information. By narrowing down the image information for multiple terminals 100 on the basis of identification information in this way, a comparison between the image information and the imaging information can be easily performed on the terminal 200 side, which enables the processing load to be significantly reduced.

Also, the dictionary data may be searched in order from the most recently recorded, on the basis of the order in which the dictionary data was recorded on the server 300.

Figure 7:
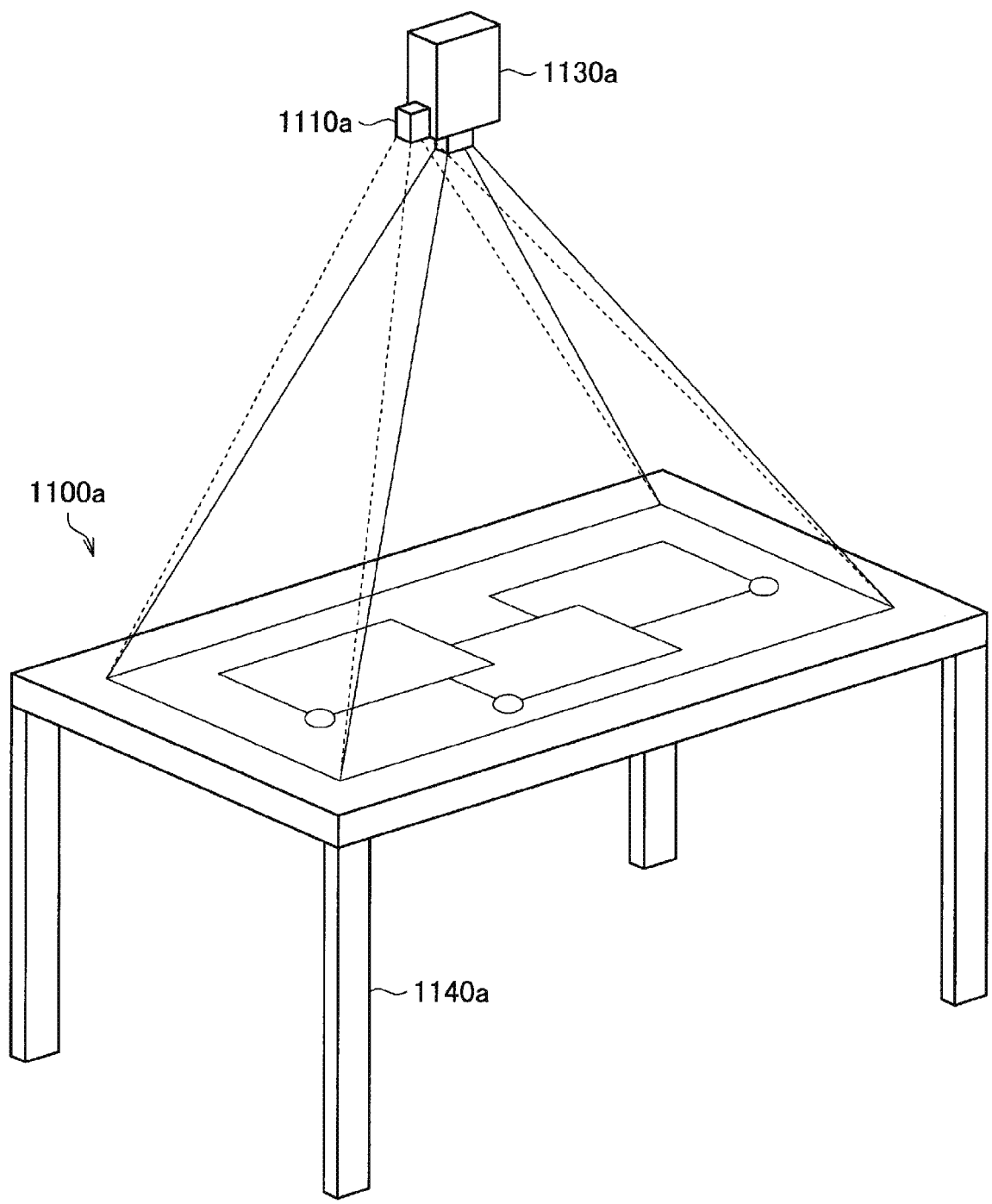
FIG. 7 is a schematic view of a system in which a tabletop interactive system and a terminal such as a smartphone are linked.

6. Examples of Application of the Embodiment 6.1. Application to a Tabletop Interactive System Several examples in which the embodiment has been applied are described below. FIG. 7 is a schematic view of a system in which a tabletop interactive system and a terminal such as a smartphone are linked. As illustrated in FIG. 7, this system 1100a includes an input unit 1110a and an output unit 1130a. The information processing system 1100a according to an embodiment of the present disclosure illustrated in FIG. 7 displays information on a top surface of a table 1140a, and allows a user using the information processing system 1100a to manipulate the information displayed on the table 1140a. As illustrated in FIG. 7, the method for displaying the information on the top surface of the table 1140a is also referred to as a "projection type".

The input unit 1110a is a device that inputs content of an operation by the user using the information processing system 1100a, and the shape and pattern and the like of an object placed on the table 1140a. In the example illustrated in FIG. 7, the input unit 1110a is provided in a state suspended from a ceiling, for example, above the table 1140a. That is, the input unit 1110a is provided away from the table 1140a on which the information is to be displayed. A camera that images the table 1140a with a single lens, a stereo camera capable of imaging the table 1140a with two lenses and recording information in the depth direction, or a microphone for recording sounds spoken by a user using the information processing system 1100a or ambient sounds of the environment where the information processing system 1100a is placed, or the like may be used as the input unit 1110a.

If a camera that images the table 1140a with a single lens is used as the input unit 1110a, the information processing system 1100a is able to detect an object placed on the table 1140a, by analyzing the image captured by the camera. Also, if a stereo camera is used as the input unit 1110a, a visible light camera or an infrared camera or the like, for example, can be used as the stereo camera. By using a stereo camera as the input unit 1110a, the input unit 1110a can acquire depth information. By acquiring depth information with the input unit 1110a, the information processing system 1100a is able to detect a hand or an object placed on the table 1140a, for example. Also, by acquiring depth information with the input unit 1110a, the information processing system 1100a is able to detect when a hand of the user contacts or is close to the table 1140a, and detect when the hand leaves the table 1140a. Note that in the description below, movements in which the user brings an operating body such as a hand into contact with, or close to, an information display surface will also collectively be referred to simply as a "touch".

Also, if a microphone is used as the input unit 1110a, a microphone array for picking up sounds in a specific direction can be used as the microphone. If a microphone array is used as the input unit 1110a, the information processing system 1100a may adjust the pickup direction of the microphone array to a suitable direction.

Hereinafter, mainly a case in which an operation by the user is detected from an image captured by the input unit 1110a will be described, but the present disclosure is not limited to this example. The operation by the user may also be detected by a touch panel that detects the touch of a finger or the like of the user. Also, aside from this, a user operation that can be acquired by the input unit 1110a can include a stylus operation with respect to an information display surface, or a gesture with respect to a camera or the like, for example.

The output unit 1130a is a device that displays information on the table 1140a and outputs audio, in accordance with information input by the input unit 1110a, such as the content of an operation by the user using the information processing system 1100a, the content of information being output by the output unit 130a, and the shape and pattern and the like of an object placed on the table 1140a. A projector or a speaker or the like, for example, is used as the output unit 1130a. In the example illustrated in FIG. 7, the output unit 1130a is provided in a state suspended from a ceiling, for example, above the table 140a. If the output unit 1130a is configured by a projector, the output unit 1130a projects information onto the top surface of the table 1140a. If the output unit 1130a is configured by a speaker, the output unit 1130a outputs audio on the basis of an audio signal. If the output unit 1130a is configured by a speaker, the number of speakers may be one or a plurality. If the output unit 1130a is configured by a plurality of speakers, the information processing system 1100a may limit the speakers from which audio is output, or may adjust the direction in which the audio is output.

Also, if the information processing system 1100a is a projection type system as illustrated in FIG. 7, the output unit 1130a may also include lighting equipment. If the output unit 1130a includes lighting equipment, the information processing system 1100a may control the on/off state and the like of the lighting equipment on the basis of information input by the input unit 1110a.

The user using the information processing system 1100a is able to manipulate the information displayed on the table 1140a by the output unit 1130a, by placing a finger or the like on the table 1140a. Also, by placing an object on the table 1140a and having the input unit 1110a recognize the object, the user using the information processing system 1100a is able to execute various operations relating to the recognized object.

Note that, although not illustrated in FIG. 7, another device may be connected to the information processing system 1100a. For example, lighting equipment for illuminating the table 1140a may be connected to the information processing system 1100a. By connecting lighting equipment for illuminating the table 1140a to the information processing system 1100a, the information processing system 1100a is able to control the lighting state of the lighting equipment in accordance with the state of the information display surface.

Figure 8:
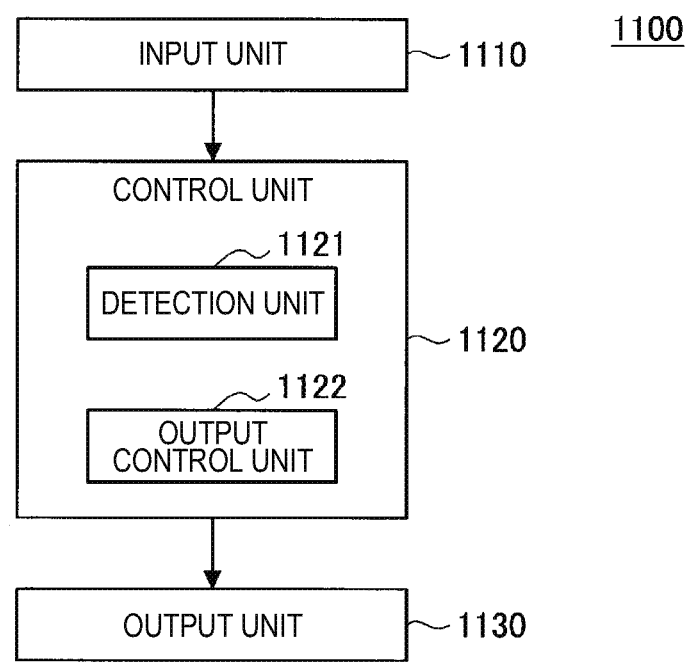
FIG. 8 is an explanatory view illustrating a functional configuration example of an information processing system in FIG. 7.

FIG. 8 is an explanatory view illustrating a functional configuration example of an information processing system 1100 in FIG. 7. Below, a functional configuration example of an image processing system according to an embodiment of the present disclosure will be described with reference to FIG. 8.

As illustrated in FIG. 8, the information processing system 1100 according to an embodiment of the present disclosure includes an input unit 1110 a control unit 1120, and an output unit 1130.

The input unit 1110 inputs content of an operation with respect to the information processing system 1100 by a user using the information processing system 1100, and the shape and pattern and the like of an object placed on a surface (e.g., the table 1140a illustrated in FIG. 7) onto which information is output by the output unit 1130. The content of an operation with respect the information processing system 1100 by a user using the information processing system 1100 includes the content of an operation with respect to GUI that the information processing system 1100 outputs onto the information display surface. Information input by the input unit 1110, such as the content of an operation with respect to the information processing system 1100, and the shape and pattern and the like of the object, is sent to the control unit 1120.

If the information processing system 1100 is a projection type system, the input unit 1110 may be configured by a camera with a single lens, a stereo camera with two lenses, or a microphone, or the like.

The control unit 1120 controls the various units of the information processing system 1100. For example, the control unit 1120 generates information to be output from the output unit 1130, using information input by the input unit 1110. As illustrated in FIG. 8, the control unit 1120 includes a detection unit 1121 and an output control unit 1122. The detection unit 1121 executes a process for detecting the content of an operation with respect to the information processing system 1100 by a user using the information processing system 1100, the content of information being output by the output unit 1130, and the shape and pattern and the like of an object placed on a surface (e.g., the table 1140a illustrated in FIG. 7) onto which information is output by the output unit 1130. The content detected by the detection unit 1121 is sent to the output control unit 1122. The output control unit 1122 executes control to generate information to be output from the output unit 1130, on the basis of the content detected by the detection unit 1121. The information generated by the output control unit 1122 is sent to the output unit 1130.

For example, if the information processing system 1100 is the projection type system illustrated in FIG. 7, the detection unit 1121 is able to detect what portion of the GUI an operating body such as a hand of the user touched, by a correction being made beforehand such that the coordinates on the information display surface match the coordinates where the operating body such as the hand of the user touched the display surface.

The control unit 1120 may also be configured by a central processing unit (CPU) or the like, for example. If the control unit 1120 is configured by a device such as a CPU, the device may be configured by an electronic circuit.

Also, although not illustrated in FIG. 8, the control unit 1120 may include a communication function for performing wireless communication with another device, and a function for controlling the operation of another device, e.g., lighting equipment, connected to the information processing system 1100.

The output unit 1130 outputs information input by the input unit 1110, in accordance with information such as the content of an operation by the user using the information processing system 1100, the content of information being output by the output unit 1130, and the shape and pattern and the like of an object placed on a surface (e.g., the table 1140a illustrated in FIG. 7) onto which the output unit 1130 outputs information. The output unit 1130 outputs the information on the basis of the information generated by the output control unit 1122. The information output by the output unit 1130 includes information to be displayed on the information display surface, and audio to be output from a speaker (not shown) or the like, and so on.

The information processing system 1100 illustrated in FIG. 8 may be configured as a single device, or a portion of the information processing system 1100 or the entire information processing system 1100 illustrated in FIG. 8 may be configured by separate devices. For example, in the functional configuration example of the information processing system 1100 illustrated in FIG. 8, the control unit 1120 may be provided in a device such as a server that is connected to the input unit 1110 and the output unit 1130 by a network or the like. In the case where the control unit 1120 is provided in a device such as a server, information from the input unit 1110 is sent to the device such as the server over the network or the like. The control unit 1120 then processes the information from the input unit 1110, and information to be output by the output unit 1130 is sent from the device such as the server to the output unit 1130 over the network or the like.

If the information processing system 1100 according to an embodiment of the present disclosure is configured to project information onto a table, and enable a user to manipulate the information, as illustrated in FIG. 7, for example, the information processing system 1100 can be linked to a mobile terminal such as a smartphone on the table. For example, the information processing system 100 according to an example of the present disclosure is able to identify a mobile terminal such as a smartphone, and link to the identified mobile terminal, by the user placing the mobile terminal on the table and having the input unit 1110 recognize the mobile terminal.

However, if a plurality of users owning the exact same mobile terminal place these same mobile terminals separately on the table at the same time, and try to have the information processing system 1100 recognize these mobile terminals, the information processing system 1100 will be unable to determine which of the mobile terminals to link to.

Therefore, with an embodiment of the present disclosure, even if a plurality of users owning the exact same mobile terminal place these same mobile terminals separately on the table at the same time, it is possible to easily determine which mobile terminal to link to by making the determination using the image information described above. In this case, the terminal 100 to be recognized corresponds to the mobile terminal, and the recognizing terminal 100 corresponds to the information processing system 1100. Therefore, the information processing system 1100 can be linked to each of the mobile terminals.

6.2. Wearable Devices and Other Display Devices

Figure 9:
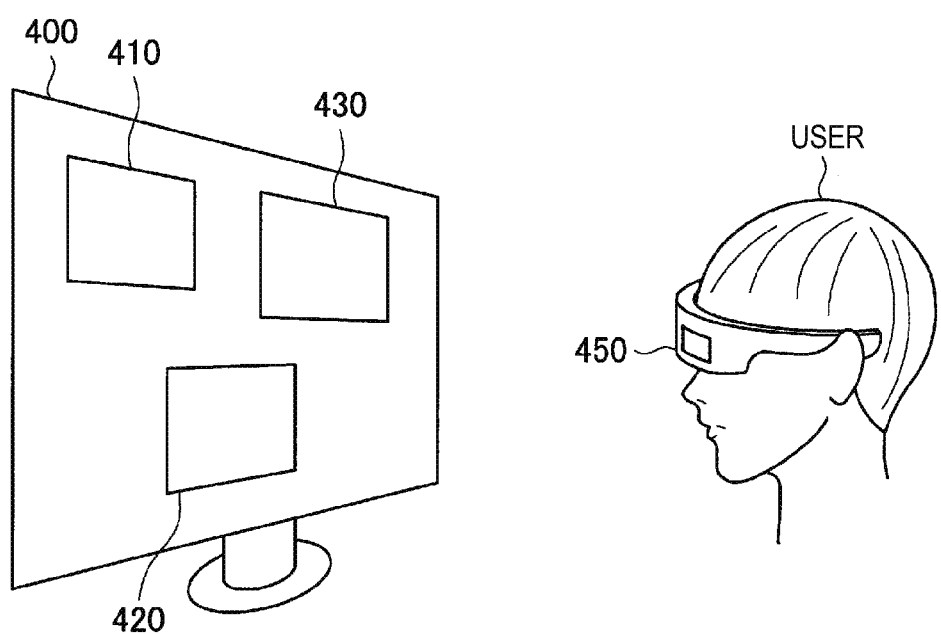
FIG. 9 is a schematic view of an example of linking a stand-alone display to a wearable device.

FIG. 9 is a schematic view of an example in which a stand-alone display 400 and a wearable device 450 are linked. Here, the stand-alone display 400 corresponds to the terminal 100 to be recognized, and the wearable device 450 corresponds to the recognizing terminal 200. The wearable device 450 images one application screen 410, 420, or 430 displayed on the stand-alone display 400 using the camera 202, and compares the image information recorded on the server 300 beforehand with the imaging information. If, upon this comparison, the image information recorded on the server 300 beforehand and the imaging information match, the wearable device 450 is able to communicate with the application.

6.3. Recognition of Applications on a Large Screen Display Installed on a Wall

Figure 10:
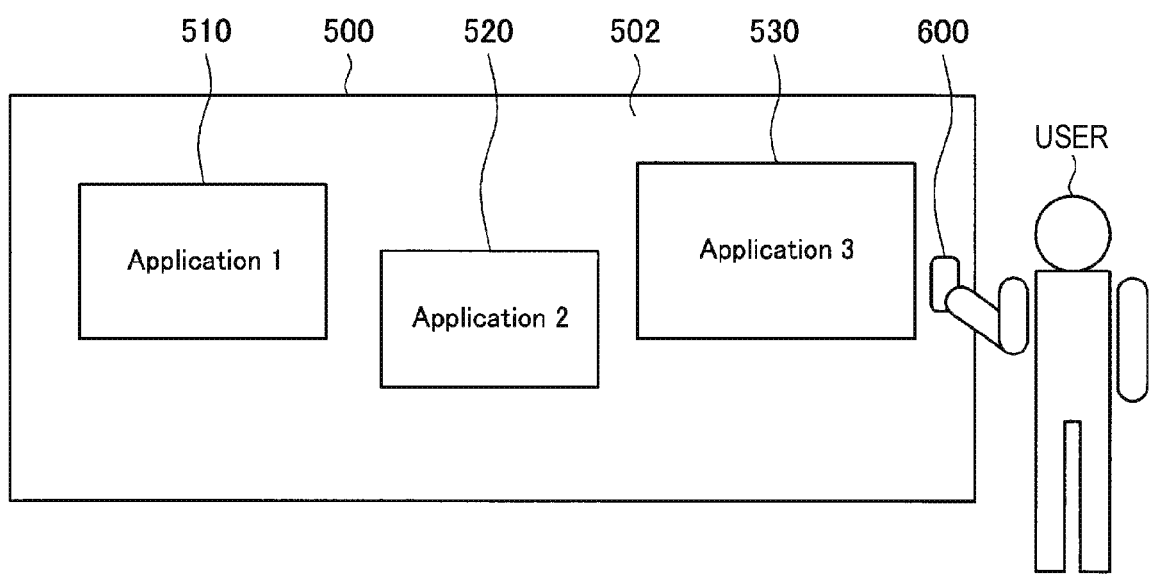
FIG. 10 is a schematic view illustrating a case in which applications on a large screen display installed on a wall are recognized.

FIG. 10 is a schematic view illustrating a case in which applications on a large screen display 500 installed on a wall are recognized. As illustrated in FIG. 10, the large screen display 500 is installed with a screen 502 vertical to the ground. A plurality of applications 510, 520, and 530 are running on the screen 502.

Image information for each application, or an arbitrary one or a plurality of applications, displayed on the screen 502 of the large screen display 500 is sent, together with communication information, to the server 300 and recorded on the server 300.

On the other hand, the user uses an application on his or her smartphone 600 and images the application screen displayed on the screen 502. As a result, the smartphone 600 recognizes the screens of the applications 510, 520, and 530.

The smartphone 600 corresponds to the recognizing terminal 200 described above. The smartphone 600 compares the image information for the applications 510, 520, and 530 recorded on the server 300 with the captured image. If, upon this comparison, the image information for the applications 510, 520, and 530 recorded on the server 300 and the captured image match, communication between the smartphone 600 and the application 510 is realized.

Various linked applications can be executed by using communication obtained by the smartphone 600 recognizing the application screen. For example, image, video, and music data on the smartphone 600 can be played on the application 510 of the large screen display 500. Also, a plurality of users can also play card games and the like by smartphones owned by the plurality of users recognizing one application 510 on the large screen display 500 and communicating with each other.

Note that in FIG. 10, the applications 510, 520, and 530 on the large screen display 500 are recognized, but an application on a screen of the smartphone 600 of the user can also be recognized by a camera placed on the large screen display 500. In this case, the large screen display 500 corresponds to the recognizing terminal 200, and the smartphone 600 corresponds to the terminal 100 to be recognized.

6.4. Wearable Cameras and Home Electric Appliances

Figure 11:
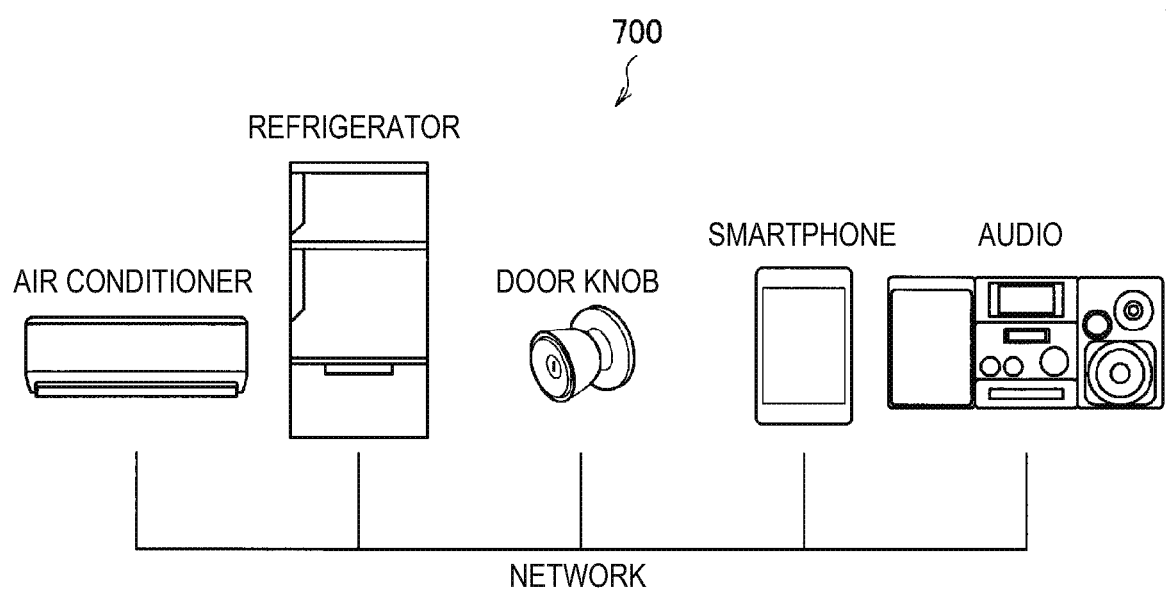
FIG. 11 is a schematic view of objects such as home electric appliances that are connected to a network at home.

FIG. 11 is a schematic view of objects 700 such as home electric appliances that are connected to a network at home. These objects 700 that are connected to the network correspond to the terminal 100 to be recognized. The objects 700 such as home electric appliances record pictures of the appearance and 3D model data of themselves in the dictionary data storage function of the server 300.

Therefore, with the system illustrated in FIG. 11, the objects 700 corresponding to the terminal 100 to be recognized acquire appearance information relating to appearance features of themselves, and record this appearance information on the server 300. The user wears a wearable device 450 similar to the wearable device in FIG. 9. This wearable device 450 corresponds to the recognizing terminal 100. The wearable device 450 acquires images of these objects 700 by imaging the objects 700 with the camera 202, and determines whether the images matches the appearance information provided by the server 300. If the images match the appearance information provided by the server 300, the wearable device 450 communicates with the objects 700.

Various applications can be executed using communication obtained by recognition. For example, an application for setting an air conditioner can be executed by an operation from the wearable device 450, as a result of recognizing the air conditioner. Also, an application for unlocking a lock in a door knob can be executed by an operation from the wearable device 450, as a result of recognizing the lock. Note that in FIG. 10, recognition is performed by the wearable device 450, but recognition may also be performed by a mobile device such as a smartphone. Also, the device connected to the network in FIG. 10 is an example, and is not limited to being a connected device or object.

As described above, according to the embodiment, an unknown application or a dynamically changing application can be recognized, via image recognition, by the sending, in real time, features and a snapshot of the application that is to be recognized, and using the features and the snapshot as dictionary data in the terminal 100 that performs the recognition.

Also, a linking application using a plurality of devices can also be executed by being recognized by the plurality of devices. Also, when a device or an object is connected to a network, the device or object can be recognized by, and linked to, another device without performing the recording operation beforehand, by dynamically recording an image of the appearance, and 3D model data, of the device or object as dictionary data.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification. Additionally, the present technology may also be configured as below.

(1)
An information processing apparatus including:
an appearance information acquisition unit configured to acquire appearance information indicating a feature of appearance of an own device; and
a sending unit configured to send the appearance information to communicate with another device that has imaged the appearance of the own device.

(2)
The information processing apparatus according to (1), including:
a display screen,
in which the appearance information acquisition unit includes an image information generation unit configured to generate image information indicating a feature of a screen displayed on the display screen as the appearance information.

(3)
The information processing apparatus according to (2), in which the sending unit sends, together with the image information, communication information for communicating with the other device.

(4)
The information processing apparatus according to (2), in which
a plurality of applications are displayed on the display screen, the image information generation unit generates the image information for each of the plurality of applications, and the sending unit sends the image information generated for each application.

(5)

The information processing apparatus according to (2), in which communication is performed with the other device for which it has determined that a captured image of the display screen and the image information match.

(6)

The information processing apparatus according to (2), including:

an identification information acquisition unit configured to acquire identification information for identifying the other device, in which the sending unit sends the identification information together with the image information.

(7)

The information processing apparatus according to (6), in which the identification information includes at least a portion of an IP address of the other device.

(8)

The information processing apparatus according to (6), in which the identification information acquisition unit acquires the identification information sent by beacon, sound, or light.

(9)

The information processing apparatus according to (2), including:

a position information acquisition unit configured to acquire position information, in which the sending unit sends the position information together with the image information.

(10)

An information processing method including:

acquiring appearance information indicating a feature of appearance of an own device; and sending the appearance information to communicate with another device that has imaged the appearance of the own device.

(11)

A program for causing a computer to function as means for acquiring appearance information indicating a feature of appearance of an own device, and means for sending the appearance information to communicate with another device that has imaged the appearance of the own device.

(12)

An information processing apparatus including:

an imaging unit configured to image another device;

an appearance information acquisition unit configured to acquire appearance information indicating a feature of appearance of the other device from a server;

an image recognition unit configured to compare the captured image obtained through the imaging performed by the imaging unit with the appearance information; and a communication unit configured to communicate with the other device if the result of the comparison by the image recognition unit is such that the captured image obtained through the imaging performed by the imaging unit and the appearance information match.

(13)

An information processing apparatus including:

an appearance information acquisition unit configured to acquire appearance information indicating a feature of appearance of a first terminal from the first terminal;

a storage unit configured to store the appearance information; and a sending unit configured to send, in response to a request from a second terminal, the appearance information to the second terminal to cause the second terminal to compare imaging information obtained by imaging appearance of the first terminal with the appearance information.

REFERENCE SIGNS LIST

100 terminal to be recognized
102 image information generation unit
104 communication unit
106 GPS
108 identification information acquisition unit
200 recognizing terminal

The invention claimed is:

1. A communication processing apparatus, comprising:
an imaging device configured to acquire captured-image information; and
circuitry configured to:
acquire, from a server, a part of displayed-image information representing a specific application,
wherein the part of the displayed-image information is displayed and is dynamically changed by a display device different from the communication processing apparatus;
determine, based on image recognition, whether the captured-image information matches the part of the displayed-image information;
acquire, from the server, communication information based on the determination that the captured-image information matches the part of the displayed-image information,
wherein the communication information is defined for at least one of a network interface, an internet layer, a transport layer, an application layer, or a communication format, and allows the communication processing apparatus to communicate with the display device or the specific application; and
initiate communication with the display device or the specific application based on the communication information.

2. The communication processing apparatus according to claim 1,
wherein the part of the displayed-image information includes a part of a moving image of the specific application, and
wherein the circuitry is further configured to:
send, to the server, a request to send the part of the moving image; and
acquire, from the server, the part of the moving image of which a displayed timing corresponds to a timing of the request.

3. The communication processing apparatus according to claim 1, further comprising
a position sensor configured to acquire position information of the communication processing apparatus,
wherein the circuitry is further configured to:
send, to the server, a request to send the part of the displayed-image information along with the position information; and
acquire, from the server, the part of the displayed-image information corresponding to the position information.

4. The communication processing apparatus according to claim 1, wherein the specific application is an unknown application for the communication processing apparatus, and
wherein the communication processing apparatus does not have dictionary data of the specific application for the image recognition before acquiring the part of the displayed-image information.

5. The communication processing apparatus according to claim 1, further comprising
a storage unit including at least one of image data, video data, or music data,
wherein the circuitry is further configured to control the display device to play the at least one of the image data, the video data, or the music data based on the communication information.

6. A communication processing method, comprising
acquiring, from a first device, a part of displayed-image information representing a specific application,
wherein the part of the displayed-image information is displayed and is dynamically changed by the first device;
acquiring, from an imaging device of a second device different from the first device, captured-image information representing surroundings of the second device,
determining, based on image recognition, whether the captured-image information matches the part of the displayed-image information;
acquiring, from the first device, communication information based on the determination that the captured-image information matches the part of the displayed-image information, wherein the communication information is defined for at least one of a network interface, an internet layer, a transport layer, an application layer, or a communication format, and allows the second device to communicate with the first device or the specific application; and
initiating, based on the communication information, communication between the first device and the second device or between the specific application and the second device.

7. A non-transitory computer-readable medium, having stored thereon, computer-executable instructions, which when executed by a processor of a communication processing apparatus, cause the processor to execute operations, the operations comprising:
acquiring, from a first device, a part of displayed-image information representing a specific application,
wherein the part of the displayed-image information is displayed and is dynamically changed by the first device;
acquiring, from an imaging device of a second device different from the first device, captured-image information representing surroundings of the second device,
determining, based on image recognition, whether the captured-image information matches the part of the displayed-image information;
acquiring, from the first device, communication information based on the determination that the captured-image information matches the part of the displayed-image information, wherein the communication information is defined for at least one of a network interface, an internet layer, a transport layer, an application layer, or a communication format, and allows the second device to communicate with the first device or the specific application; and
initiating, based on the communication information, communication between the first device and the second device or between the specific application and the second device.

* * * * *